United States Patent
Nakamura et al.

[11] Patent Number: 6,057,516
[45] Date of Patent: May 2, 2000

[54] THERMOGRAVIMETRIC INSTRUMENT

[75] Inventors: Toshihiko Nakamura; Haruo Takeda, both of Chiba, Japan

[73] Assignee: Seiko Instruments, Inc., Chiba, Japan

[21] Appl. No.: 08/896,664

[22] Filed: Jul. 18, 1997

[30] Foreign Application Priority Data

Jul. 29, 1996 [JP] Japan ................................. 8-199409

[51] Int. Cl.[7] .......................... G01G 23/02; G01G 1/38; G01G 3/14; G01N 25/00
[52] U.S. Cl. .......................... 177/212; 177/154; 177/157; 374/14
[58] Field of Search ............................. 374/14; 177/245, 177/154, 155, 156, 157, 158, 159, 210 EM, 212, 213, 214, 215, 184, 186, 187, 188, 189, 126, 128

[56] References Cited

U.S. PATENT DOCUMENTS

| | | | |
|---|---|---|---|
| 3,354,710 | 11/1967 | Johnson | 177/154 |
| 3,469,455 | 9/1969 | Iwata | 374/14 |
| 3,997,014 | 12/1976 | Soderholm et al. | 177/128 |
| 4,606,649 | 8/1986 | Mikhail | 374/14 |
| 4,625,819 | 12/1986 | O'Neill | 177/212 |
| 5,319,161 | 6/1994 | Miller et al. | 177/154 |
| 5,321,719 | 6/1994 | Reed et al. | 374/14 |
| 5,425,278 | 6/1995 | Perkins | 177/211 |
| 5,466,066 | 11/1995 | Hidaka | 374/14 |
| 5,493,078 | 2/1996 | Uchiike | 374/14 |

FOREIGN PATENT DOCUMENTS

| | | | |
|---|---|---|---|
| 0053556 | 3/1986 | Japan | 374/14 |
| 406221982 | 8/1994 | Japan | 374/14 |

*Primary Examiner*—Randy W. Gibson
*Attorney, Agent, or Firm*—Loeb & Loeb, LLP

[57] ABSTRACT

A thermogravimetric instrument for measuring variations in the weight of a sample caused by temperature variations of the sample. The instrument is equipped with a stopper mechanism for protecting the pivot to facilitate replacing a balance beam. A thermogravimetric instrument comprising: a balance beam 1 placed horizontally; a sample holder 9 located at one end of said balance beam; a torsion wire 3 mounted as a pivot and connected with the other end; a junction portion permitting a sample container side of the balance beam to be detached; and one or more stopper mechanisms using fixed stoppers 4 and metal plates 5. The stopper mechanisms limit relative movement between a supported portion of the torsion wire and the balance beam to within a prescribed amount to limit force applied to the torsion wire during detachment of the balance beam.

13 Claims, 4 Drawing Sheets

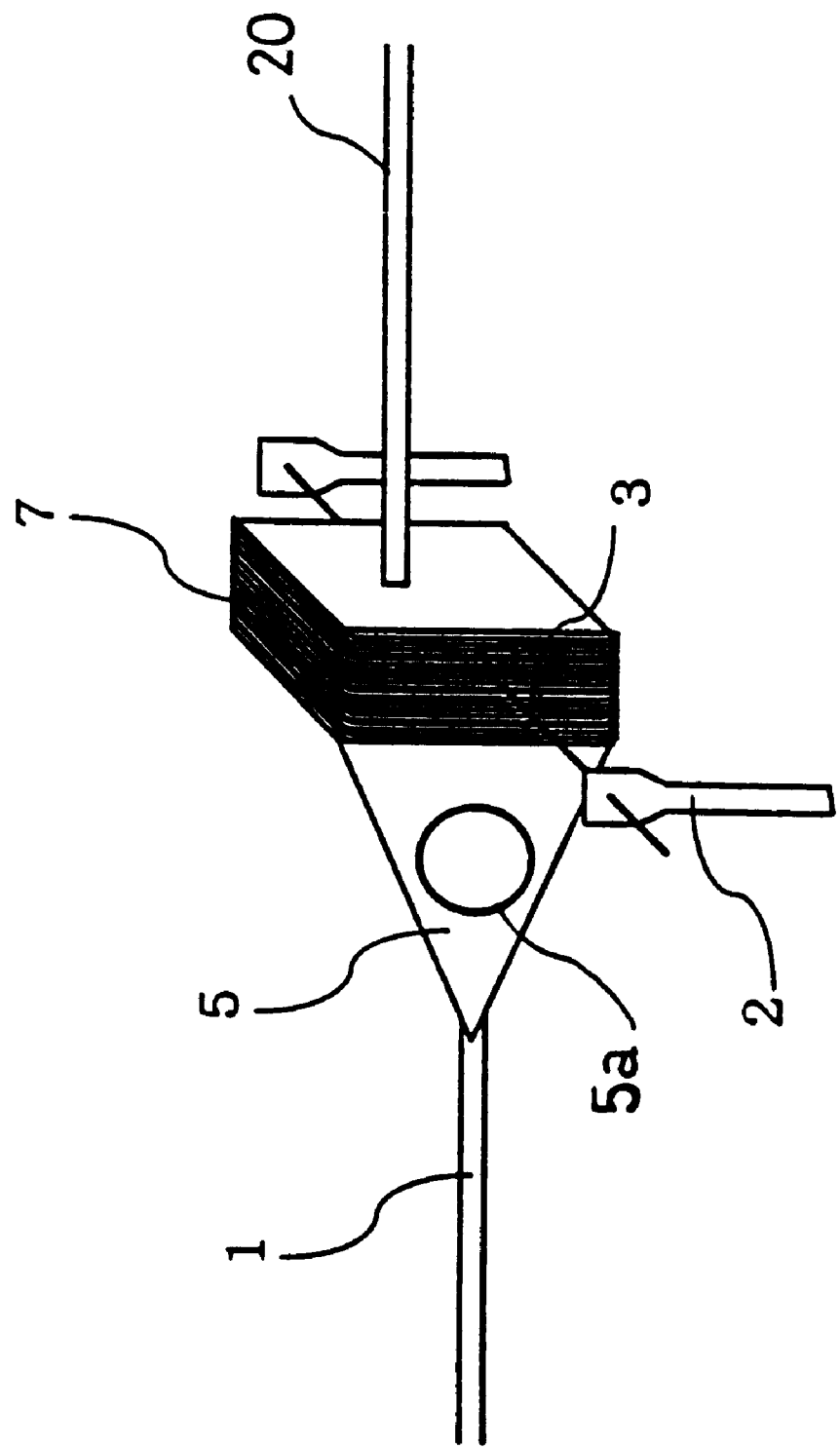

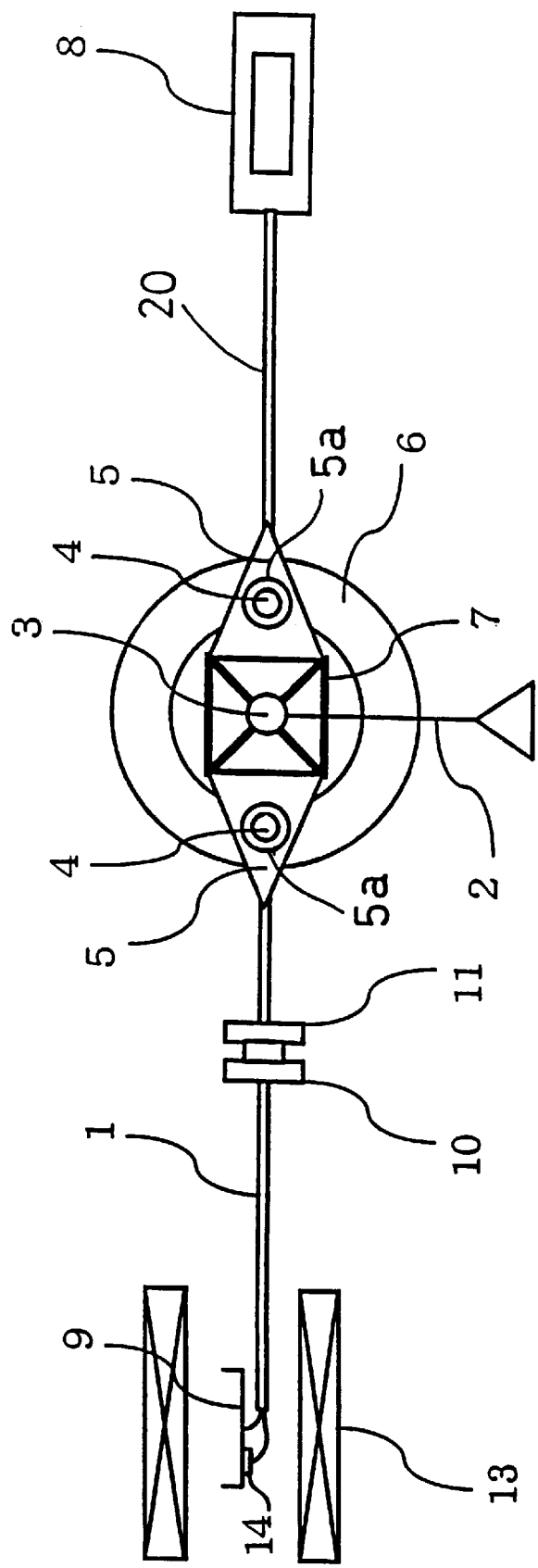

THERMOGRAVIMETRIC INSTRUMENT

BACKGROUND OF THE INVENTION

The present invention relates to a thermogravimetric instrument for measuring changes in the weight of a sample caused by temperature changes.

A differential thermo-balance having a horizontally placed balance beam and available as a conventional instrument of this kind is described in Japanese Patent No. SHO 62-4654 (issued Jan. 31, 1987). In this instrument, a sample holder for holding both a sample and a sample container is spaced from a pivot, which in turn holds the balance horizontally and in a tiltable manner. Although not mentioned in the prior literature, a torsion wire mounted as a pivot for the balance beam acts to sustain the weight of the balance beam and to produce a rotation moment within a plane vertical to the axis because of a quite small torsional rigidity for detection of slight changes in the weight of the sample.

With this instrument, if the sample boils over or the sample container is fused and bonded to the beam to thereby make the instrument unusable, it is necessary to detach the balance beam. In this case, the balance beam is replaced by a new one by detaching the old balance beam at the position of a junction portion at the midway position of the balance beam. The junction portion permits mounting a sample holder side balance beam. The old balance beam is detached at the location of the junction portion. Then, the old beam is replaced with a new one.

Where the balance beam should be detached, the following method may also be adopted. A part of the balance beam is anchored with a clamp or the like to prevent application of any load to the pivot. The balance beam is then disconnected from the junction portion. Thereafter, the balance beam is detached.

With the aforementioned configuration, the following problems take place when the balance beam is detached.

In order to enhance the weight sensitivity of the balance, the above-described balance beam and torsion wire are so constructed as to minimize the weight of the balance beam and the torsional rigidity of the torsion wire. Although the mechanical rigidity of the torsion wire is reduced to improve the weight sensitivity of the balance, the mechanical rigidity must high enough to withstand mechanical loads as encountered during replacement of the sample container on the sample holder or during normal measurement operations. That is, the actual torsion wire should be high enough to stand up to mechanical loads encountered when normal measurement operations are performed.

In order to make replaceable the sample container side of the above-described balance beam, the junction portion is mounted to the balance beam, pushed, pulled, rotated, or otherwise operated to permit detachment. Where the balance beam is detached at the location of the junction portion, a mechanical load is imposed on the torsion wire acting as the pivot of the balance beam. This mechanical load must be large enough to enable the detachment. The minimum force necessary for the detachment is an external force necessary to cause the balance beam to make a transition from a stationary state in which the junction portion is coupled to the balance beam to a disconnected state in which the junction portion is disconnected from the balance beam. The minimum force described above is sufficiently larger than mechanical loads applied to the torsion wire during normal operations, because disengagement of the junction portion during normal operations such as replacement of the sample container should be avoided.

Accordingly, when the above-described balance beam is detached, the mechanical load applied to the torsion wire exceeds the strength of the torsion wire fabricated to have appropriate strength, thus producing undesirable results.

To prevent the torsion wire from being damaged, it is necessary to increase the strength to a level so that the wire can withstand the minimum force necessary for the detachment. If the strength is increased, the balance sensitivity is deteriorated greatly, thus impairing the performance of the instrument.

In some structure, the movement of the balance beam is constrained by clamping or otherwise holding a portion that is closer to the pivot of the balance than the junction portion of the balance beam. Thus, the load applied during detachment of the balance beam is prevented from being transmitted to the pivot of the balance.

In this case, however, the clamp must be detached during normal measurement. Whenever the balance beam is replaced, the beam must be clamped, thus creating an inconvenient situation.

If the sample holder and the balance beam are erroneously detached without clamping or otherwise holding the balance beam, a large mechanical load is applied to the torsion wire that is mounted as the pivot of the balance beam. There will be danger of breakage or damage.

If the relative positional relation between the balance beam and the holding clamp deviates for some reason or other, the position of the balance beam differs before and after the clamping operation. Rather, the clamping operation exerts a large mechanical load on the torsion wire of the pivotal portion of the balance beam with undesirable results.

Accordingly, it is an object of the present invention to provide a mechanism for preventing application of a large mechanical load to a torsion wire without increasing the strength of the torsion wire acting as the pivot of a balance, without lowering the weight sensitivity of the balance, and without performing any special clamping operation during replacement of the balance beam. That is, relative movement between the supported portion of the torsion wire and the balance beam is restricted to within a prescribed amount to prevent the torsion wire from deforming beyond its resilient deformation region.

SUMMARY OF THE INVENTION

To solve the foregoing problems, the invention provides a thermogravimetric instrument comprising: a balance beam placed horizontally; a sample holder on which a sample container is to be placed and which is located at one end of said balance beam; a torsion wire mounted as a pivot and connected with the other end; a junction portion mounted between said pivot and said sample holder, said balance beam having a sample container side that can be detachably attached to the junction portion; and one or more sets of stopper mechanisms for limiting relative movement between a supported portion of said torsion wire and said balance beam to within a prescribed amount to limit a force applied to the torsion wire acting as the pivot of the torsion wire during detachment of said balance beam.

On the balance portion of the thermogravimetric instrument constructed with the novel mechanism as described above, the balance beam moves only slight distances during normal thermogravimetric measurements and thus the distances are within the prescribed amount of the stopper. Therefore, the measurement can be carried out independent of the stopper mechanisms.

When the balance beam is detached, the balance beam must be pulled, pushed, or otherwise operated, and the balance beam moves a great distance. However, movement around the pivot is constrained to within the prescribed amount and within the resilient deformation region. Therefore, no large load is applied to the torsion wire at the pivot of the balance. Hence, the wire can be prevented from getting damaged.

In this way, the invention provides a mechanism for protecting the torsion wire and does not require any clamping operation or the like during replacement of the balance beam. The mechanism can perform thermogravimetric measurements intact. Also, the sample holder and the balance beam can be detached intact.

BRIEF DESCRIPTION OF THE DRAWINGS

FIG. 2 is a perspective view of the pivotal portion of the balance beam of the example shown in FIG. 1;

FIG. 3 is a view illustrating an example in which plural stopper mechanisms are mounted to produce enhanced stopper function; FIG. 4a is a perspective view of the stopper mechanism; and FIG. 4b is a cross-sectional view of the stopper mechanism.

DETAILED DESCRIPTION

Figure 1:
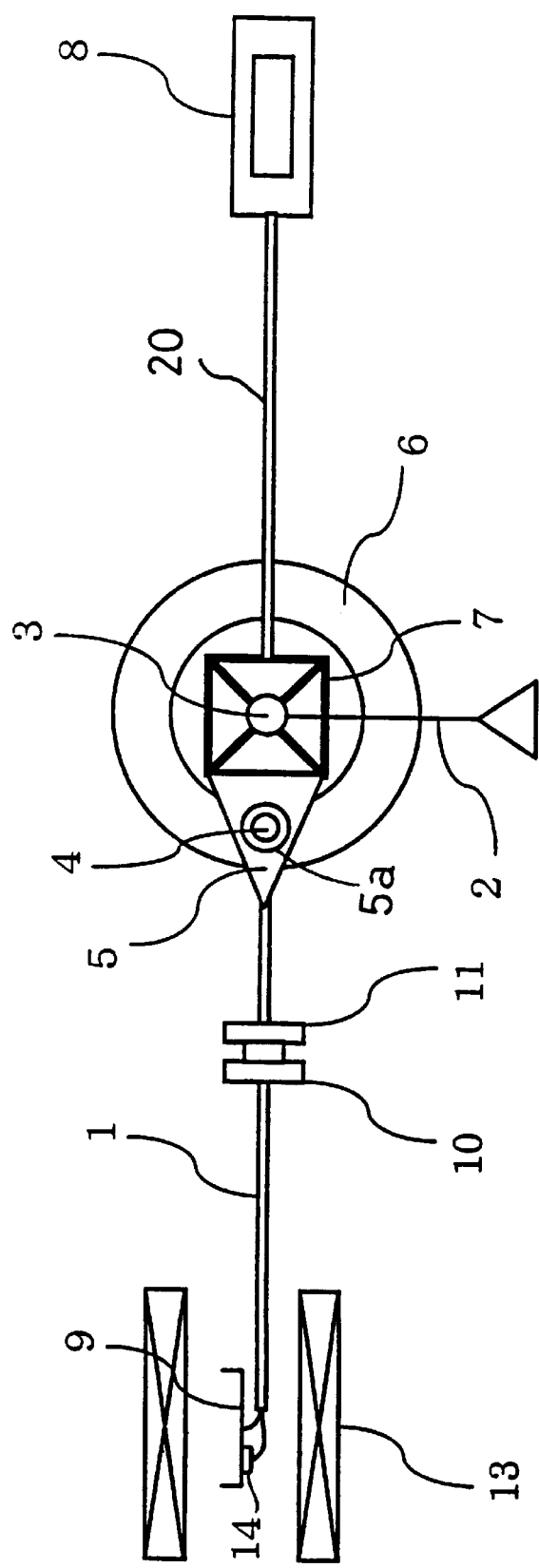
FIG. 1 is a perspective view showing the configuration of an embodiment of a thermogravimetric instrument, showing one example of the invention.

Embodiments of this invention are hereinafter described. FIG. 1 is a side elevation showing the configuration of an embodiment of the invention. FIG. 2 is a perspective view particularly showing the pivot of the embodiment.

In FIGS. 1 and 2, a balance beam 1 is placed horizontally and equipped with a sample holder 9 at its one end. A sample (not shown) is placed on this holder 9. A balance beam pivot support 2 is mounted to a balance system-mounting portion (not shown), and holds the pivot of the balance beam 1. The balance system-mounting portion is fixed. The balance beam 1 is supported by a torsion wire 3, which in turn is fixedly mounted to the balance beam pivot support 2. The balance beam 1 can rotate about the torsion wire 3, or an axis. This torsion wire 3 acts to sustain the weight of the balance beam 1 and to produce a rotation moment within a plane vertical to the axis because of slight torsional rigidity for detecting slight changes in the weight of the sample.

A coil 7 is fixedly attached to the pivotal position of the torsion wire 3. A metal plate 5 is adhesively or otherwise bonded to the coil 7 so as to extend toward the balance beam 1. The balance beam 1 is adhesively bonded, welded, or otherwise mounted to the metal plate 5. That is, the balance beam 1, the metal plate 5, and the coil 7 are fastened together to form a subassembly rotating about the torsion wire 3. In this embodiment, the coil 7 embraces a coil bobbin around which the coil is wound.

A magnet 6 is a permanent magnet fixed on the balance system-mounting portion to electromagnetically interact with the coil 7, for adjusting the angle of the tilt with respect to the balance beam 1, i.e., with respect to the axis of the torsion wire 3. If an electrical current that is adjusted by a feedback circuit (not shown) is supplied into the coil 7, electromagnetic interaction with the magnet 6 produces a moment, which rotates the balance beam 1 about the torsion wire 3 that is a pivot. That is, the coil 7 drives the balance beam 1. A balance beam angle detector 8 is attached to a lightweight beam rod 20 that is affixed to the coil 7, or the pivot of the balance beam. The beam rod 20 is placed on the opposite side of the torsion wire 3 from the balance beam 1. The balance beam 1, the torsion wire 3, and the beam rod 20 together constitute a so-called balance. The balance beam angle detector 9 detects the angle of the tilt of the balance beam 1, using a photosensor or the like. Normally, in a weight-stabilized state, the rotation moment attributed to the weight of the whole balance beam including the sample weight, the torsional rigidity of the torsion wire 3, and electromagnetic interaction between the magnet 6 and the coil 7 are in equilibrium. The balance beam 1 is placed horizontally.

The balance system is controlled by the mechanism described below. The sample is heated by a heating furnace 13 mounted around the sample. If the weight of this sample increases or decreases, the angular position of the balance beam 1 slightly deviates from horizontal. Correspondingly, a signal is sent from the balance beam angle detector 8 to the feedback circuit. The current flowing through the coil 7 is immediately readjusted, thus returning the balance beam 1 to horizontal. That is, the position is controlled by a null method. The resulting change in the electrical current is transformed into a change in the weight of the sample. The balance beam position is continuously controlled and recorded. In this manner, a thermogravimetric curve is obtained.

The torsion wire 3 is the pivot of the balance beam 1 and acts to support the beam. The wire shows a quite small rigidity against the torsional force within a plane vertical to the axis. The magnitude of the torsional rigidity is large enough to perform microgram-order measurement with the sensitivity of the weight of the balance. The upper limit of the torsional rigidity is determined by the set value of the weight sensitivity. The optimum value provides the minimum strength of the torsion wire that withstands the mechanical load encountered during normal measurement operations.

Each cylindrical metallic fixed stopper 4 is mounted on the balance system-mounting portion that is a fixed member. What is meant by the balance system-mounting portion is one which does not move relative to the balance beam 1 and so forth during measurement. The fixed stopper 4 is maintained in a fixed relation to the balance system-mounting portion. The stopper 4 is preferably located close to the torsion wire, or the pivot, so that rotary movement of the balance beam about the torsion wire 3 within a plane vertical to the axis is not affected and that horizontal movement can be constrained during replacement of the balance beam. In the illustrative embodiment, the stopper 4 is bonded to the magnet 6 close to the pivot of the balance beam with adhesive, with a screw, or by other method.

The metal plate 5 is substantially centrally provided with a round hole 5a so that the fixed stopper 4 can be inserted in the hole 5a with a gap. The gap between the hole 5a in the metal plate 5 and the fixed stopper 4 limits the relative movement between the balance beam 1 and the fixed stopper 4 to within a prescribed amount. That is, the metal plate 5 serves as a stopper that arrests movement of the balance beam 1. More specifically, the play between them is so set that they do not interfere during normal control over the balance and that damage to the torsion wire 3 is prevented during replacement of the balance beam. In the illustrative embodiment, the play is about 1 mm. In the embodiment, the metal plate 5 is originally mounted to integrate the coil 7 and the balance beam 1. If a function of stopping the fixed stopper 4 is imparted to the metal plate 5, the weight of the whole balance beam does not increase. Rather, it can be reduced. Also, increase in the weight sensitivity can be prevented. The inventive stopper mechanism by no means affects the movement of the balance beam during normal measurement and permits replacement of the balance beam.

Importantly, the stopper mechanism is so shaped that a space less than the prescribed amount is formed between both members. In the illustrative embodiment, they are a cylinder and a circular hole. Of course, the function of the stopper mechanism is assured if their roles in the embodiment are interchanged. Also, the inventive stopper mechanism will present no problems if they are shaped into forms other than circular form as long as the advantages of the invention can be produced. For example, they can assume various shapes according to purpose as described later.

Furthermore, the material is not limited to metals if sufficient strength is obtained. The sample holder 9 is mounted at the front end of the balance beam 1 to hold the sample holder. In the illustrative embodiment, a thermocouple 14 for measurement of the sample temperature is welded immediately under the sample holder 9, and lead wires from the thermocouple are passed through the balance beam 1 and connected into a detection circuit.

A junction portion 10 on the side of the sample holder and a junction portion 11 on the side of the pivot of the balance are located around the center of the balance beam 1, and closer to the sample holder 9 than the metal plate 5. That is, the balance beam 1 can be divided. Each junction portion has a mechanical junction portion and an electrical junction portion. They can be easily inserted and withdrawn, because they are designed like a socket. Furthermore, they are light in weight. The mechanical junction acts to integrate the balance beam 1. The electrical junction serves to transmit a signal indicating the sample temperature reflecting an electromotive force produced by the thermocouple 14. In the illustrative embodiment, for mechanical connection, stainless steel tubes extending along the axis of the balance beam 1 are attached to small base boards of the junction portions 10 and 11 on the side of the sample holder and on the side of the pivot of the balance, respectively. The outside diameter of one of the stainless steel tubes is coincident with the inside diameter of the other, and they are nested together. They determine the axis of the balance beam and prevent the axis from shivering. Also, for electrical connection, pairs of small metallic sockets and pins are fixed to the junction portions to couple electrical signals. The sockets and pins simultaneously mechanically hold the balance beam axially.

In the instrument of the embodiment shown in FIG. 1, an operation for replacing the balance beam is effected in the manner described below. If the sample erroneously contaminates the sample holder 9 or welding of the sample and container makes the holder 9 unusable, the sample holder side junction portion 10 on the balance beam 1 is first detached. It is replaced by a balance beam equipped with a new sample holder. In the illustrative embodiment, the junction portions 10 and 11 are made of sockets extending parallel to the balance beam. The front end portion of the balance beam is pulled horizontally to the left as viewed in FIG. 1, so that the beam is detached. The beam is pushed to the right and thus it can be readily mounted. When the beam is pulled out, the whole balance beam moves about 1 mm. However, the stopper mechanism hinders further movement. The beam is further pulled to the left. As a result, the beam can be detached without applying any great load to the pivotal torsion wire 3. When the balance beam 1 equipped with a new sample holder 9 is pushed in, the beam can be mounted without application of any mechanical load to the torsion wire 3 for the same reason.

Also, the stopper mechanism may be energized except during replacement of the balance beam For example, when the sample container is replaced, tweezers or the like is caused to catch the balance beam. A force greater than produced during normal operation is applied to the balance beam. Even in this case, movement of the balance beam at the pivot is constrained. Mechanical load from the balance beam is absorbed by the stopper mechanism. Therefore, the torsion wire 3 is little affected.

FIG. 3 shows an example in which plural stopper mechanisms are mounted to obtain enhanced stopper function. Where a pair of stopper mechanisms shown in FIG. 1 is used, if a large external upward force is applied to the balance beam 1 as encountered when tweezers are dropped onto the balance beam, there arises the possibility that a load is applied from around the sample holder 9 to the torsion wire 3 with the stopper acting as a pivot. In the embodiment shown in FIG. 3, plural sets of stopper mechanisms are used either on the balance beam 1 or at arbitrary positions of portions fixed to the balance beam or to the pivot of the balance beam. The torsion wire 3 can be prevented from getting damaged by constructing the balance portion in such a way that some stopper mechanism acts as a pivot and that any other stopper mechanism serves as a point of application. In the example of FIG. 3, two sets of stopper mechanisms are mounted which are symmetrical in position and structure with respect to the pivot of the balance.

Figures 4A, 4B:
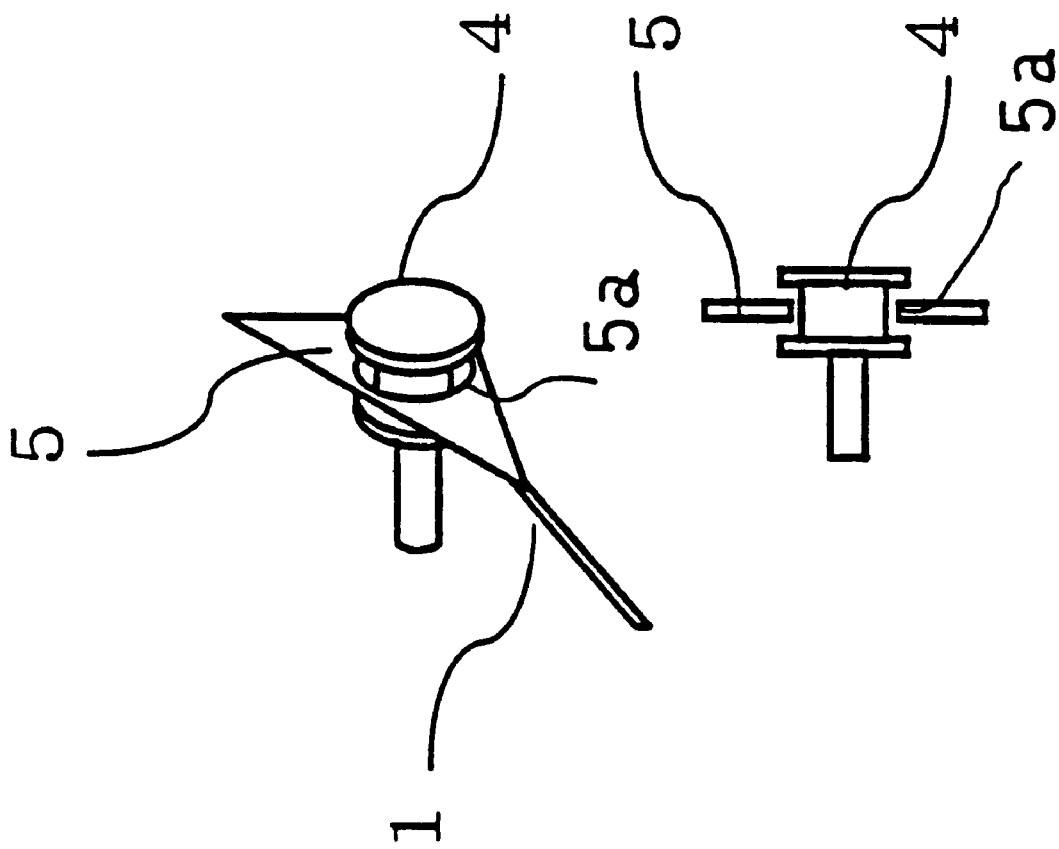
FIGS. 4a and 4b show an example of a stopper mechanism devised in such a way that the stopper mechanism acts on any force applied to a balance beam from every direction.

FIGS. 4a and 4b show an example of stopper mechanism in which it acts against forces applied to the balance beam from every direction. Relative movement between the supported portion of the torsion wire 3 at the pivot of the balance beam and the balance beam 1 is constrained to a finite amount by the stopper mechanism. The range of the relative movement is restricted by a three-dimensional space created between the fixed stopper 4 and the plate 5 on the side of the balance. If the stopper mechanism is shaped as a three-dimensional form, stopper effect is produced in the direction of a plane vertical to the torsion wire 3 and in the axial direction of the wire. Hence, stopper effect is produced in every direction of three-dimensionality. This can further reduce the possibility of damage to the torsion wire.

As described thus far, this invention provides a thermogravimetric instrument comprising a balance beam placed horizontally, a torsion wire mounted as a pivot for the balance beam, and a stopper mechanism for limiting relative movement between a fixed portion of the torsion wire and the balance beam to within a prescribed amount. Therefore, any operation for energizing the stopper function during replacement of the balance beam is not required. Thermogravimetric measurement and detachment of the sample holder and balance beam can be performed intact.

Furthermore, the stopper mechanism in accordance with the present invention can be later added to a horizontal-type thermogravimetric instrument having no stopper mechanism without affecting the weight sensitivity of the balance. If any large force is applied to the balance beam from an unexpected direction, plural stopper mechanisms or stopper mechanisms for constraining the movement in three dimensions prevent the pivot from being damaged.

What is claimed is:

1. In a thermogavitmetric device including a stationary portion including a pivot support member, a torsion wire having two ends mounted on the pivot support member to maintain a tension in a central portion of the wire, a balance beam assembly fixedly mounted on a central portion of the torsion wire and placed horizontally, the torsion wire acting as a support and pivot for the balance beam assembly and defining a pivotal axis, a sample holder mounted at one end of the balance beam assembly, a driving device for adjusting a tilt angle of the balance beam assembly around the pivot, and a sensing device for sensing a rotation of the balance beam assembly, an improvement comprising:

a stopper mechanism for limiting the range of movements of the balance beam assembly relative to the stationary portion, the stopper mechanism comprising a first stopper member mounted on the stationary portion and a second stopper member mounted on the balance beam assembly, the first and second stopper members defining a gap therebetween, wherein one of the first and second stopper members defines an opening, and the other of the first and second stopper members has a portion extending through the opening.

2. The device of claim 1, wherein the first stopper member defines a hole, and the second stopper member has a portion extending through the hole.

3. The device of claim 1, wherein the second stopper member is formed of a portion of the balance beam assembly and defines a hole, and the first stopper member has a portion extending through the hole.

4. The device of claim 3, wherein the first stopper member comprises a cylindrical member extending through the hole to define a first gap between the cylindrical member and the boundary of the hole, and two plates each attached to an end of the cylindrical member, the plates having sizes larger than the hole and located on opposite sides of the first stopper member to define a second gap between each plate and the first stopper member.

5. The device of claim 1, wherein the hole is circular in shape and the portion extending through the hole has a circular cross-section.

6. The device of claim 1, wherein the gap defined between the first and second stopper members permits a predetermined range of movements of the balance beam assembly relative to the stationary portion, but arrests movements of the balance beam assembly larger than the predetermined range.

7. The device of claim 6, wherein the predetermined range of movements allows unhindered movements of the balance beam assembly during normal thermogravimetric measurements of the device.

8. The device of claim 1, wherein the stopper mechanism limits movements of the balance beam assembly larger than a first predetermined range within a plane normal to the pivotal axis.

9. In a thermogravimetric device including a stationary portion including a pivot support member, a torsion wire having two ends mounted on the pivot support member to maintain a tension in a central portion of the wire, a balance beam assembly fixedly mounted on a central portion of the torsion wire and placed horizontally, the torsion wire acting as a support and pivot for the balance beam assembly and defining a pivotal axis, a sample holder mounted at one end of the balance beam assembly, a driving device for adjusting a tilt angle of the balance beam assembly around the pivot, and a sensing device for sensing a rotation of the balance beam assembly, an improvement comprising:

a stopper mechanism for limiting the range of movements of the balance beam assembly relative to the stationary portion, the stopper mechanism comprising a first stopper member mounted on the stationary portion and a second stopper member mounted on the balance beam assembly, the first and second stopper members defining a gap therebetween, wherein the stopper mechanism limits movements of balance beam assembly larger than a second predetermined range outside the plane normal to the pivotal axis.

10. In a thermogravimetric device including a stationary portion including a pivot support member, a torsion wire having two ends mounted on the pivot support member to maintain a tension in a central portion of the wire, a balance beam assembly fixedly mounted on a central portion of the torsion wire and placed horizontally, the torsion wire acting as a support and pivot for the balance beam assembly and defining a pivotal axis, a sample holder mounted at one end of the balance beam assembly, a driving device for adjusting a tilt angle of the balance beam assembly around the pivot, and a sensing device for sensing a rotation of the balance beam assembly, an improvement comprising:

a stopper mechanism for limiting the range of movements of the balance beam assembly relative to the stationary portion, the stopper mechanism comprising a first stopper member mounted on the stationary portion and a second stopper member mounted on the balance beam assembly, the first and second stopper members defining a gap therebetween, wherein the stopper mechanism is located close to the pivotal axis and substantially horizontally spaced therefrom so that the rotational movement of the balance beam assembly about the pivot is unhindered during normal thermogravimetric measurements and the range of horizontal movement of the balance beam assembly is limited.

11. In a thermogravimetric device including a stationary portion including a pivot support member, a torsion wire having two ends mounted on the pivot support member to maintain a tension in a central portion of the wire, a balance beam assembly fixedly mounted on a central portion of the torsion wire and placed horizontally, the torsion wire acting as a support and pivot for the balance beam assembly and defining a pivotal axis, a sample holder mounted at one end of the balance beam assembly, a driving device for adjusting the tilt angle of the balance beam assembly around the pivot, and a sensing device for sensing the rotation of the balance beam assembly, the improvement comprising:

a first stopper mechanism; and a second stopper mechanism;

each stopper mechanism comprising a first stopper member mounted on the stationary portion and a second stopper member mounted on the balance beam assembly, one of the first and second stopper members defining a hole, the other of the first and second stopper members having a portion extending through the hole, the first and second stopper members defining a gap therebetween;

the first and second stopper mechanisms located on opposite sides of the pivot for limiting the range of movements of the balance beam assembly relative to the stationary portion.

12. A balance in a thermogravimetric device, comprising:

a stationary portion including a pivot support member;

a torsion wire having two ends mounted on the pivot support member to maintain a tension in a central portion of the wire;

a balance beam assembly fixedly mounted on the central portion of the torsion wire and placed horizontally, the torsion wire acting as a support and pivot for the balance beam assembly; and a stopper mechanism for limiting the range of movements of the balance beam assembly relative to the stationary portion, the stopper mechanism including a first stopper member mounted on the stationary portion and a second stopper member mounted on the balance beam assembly, one of the first and second stopper members defining a hole, the other of the first and second stopper members having a portion extending through the hole, the first and second stopper members defining a gap therebetween.

13. A balance in a thermogravimetric device, comprising:

a stationary portion including a pivot support member;

a torsion wire having two ends mounted on the pivot support member to maintain a tension in a central portion of the wire;

a balance beam assembly fixedly mounted on the central portion of the torsion wire and placed horizontally, the torsion wire acting as a support and pivot for the balance beam assembly;

a first stopper mechanism; and a second stopper mechanism;

each stopper mechanism comprising a first stopper member mounted on the stationary portion and a second stopper member mounted on the balance beam assembly, one of the first and second stopper members defining a hole, the other of the first and second stopper members having a portion extending through the hole, the first and second stopper members defining a gap therebetween; and the first and second stopper mechanisms being located on opposite sides of the pivot for limiting the range of movements of the balance beam assembly relative to the stationary portion.

\* \* \* \* \*